United States Patent
Wang

(10) Patent No.: US 6,317,251 B1
(45) Date of Patent: Nov. 13, 2001

(54) THIN FILM ELECTRO-OPTIC BEAM STEERING DEVICE

(75) Inventor: Feiling Wang, Medford, MA (US)

(73) Assignee: Corning Applied Technologies Corporation, Woburn, MA (US)

( * ) Notice: Subject to any disclaimer, the term of this patent is extended or adjusted under 35 U.S.C. 154(b) by 0 days.

(21) Appl. No.: 09/362,208

(22) Filed: Jul. 28, 1999

Related U.S. Application Data

(63) Continuation of application No. 09/044,622, filed on Mar. 19, 1998, now abandoned, which is a continuation of application No. 08/795,281, filed on Feb. 4, 1997, now abandoned.

(60) Provisional application No. 60/011,186, filed on Feb. 5, 1996.

(51) Int. Cl.⁷ .................................................. G02F 1/29
(52) U.S. Cl. ............................ 359/318; 359/315; 359/584
(58) Field of Search ........................... 359/196–199, 359/212–215, 227, 298, 315, 317, 318, 577, 584–586

(56) References Cited

U.S. PATENT DOCUMENTS

| | | |
|---|---|---|
| 3,357,771 | 12/1967 | Burher et al. . |
| 3,510,199 | 5/1970 | Lee . |
| 3,787,111 | 1/1974 | Giordame et al. . |
| 4,313,651 | 2/1982 | Miller, Jr. . |
| 4,343,536 | 8/1982 | Watanabe et al. . |
| 4,386,827 | 6/1983 | Scifres et al. . |
| 4,439,016 | 3/1984 | Oagland et al. . |
| 4,462,658 | 7/1984 | Scrifes et al. . |
| 4,639,091 | 1/1987 | Huignard et al. . |
| 4,822,149 | 4/1989 | Kubick . |
| 4,930,853 | 6/1990 | Grego . |
| 4,937,539 | 6/1990 | Grinberg et al. ............... 330/4.3 |
| 5,061,048 | 10/1991 | Hayden et al. ................. 359/315 |
| 5,093,747 | 3/1992 | Dorschner ....................... 359/316 |
| 5,122,894 | 6/1992 | Grantham ........................ 359/245 |
| 5,159,351 | 10/1992 | Hotomi et al. .................. 346/108 |
| 5,212,583 | 5/1993 | Vali et al. ....................... 359/245 |
| 5,317,446 | 5/1994 | Mir et al. ........................ 359/296 |
| 5,444,567 | 8/1995 | Kataoka .......................... 359/319 |

FOREIGN PATENT DOCUMENTS

| 526844 | 11/1976 | (SU) | .......................... G02F/1/31 |

OTHER PUBLICATIONS

Song et al., "Electro–optic beam–steering device based on lanthanum–modified lead zirconate titanate ceramic wafer," Applied Optics, vol. 35, pp. 3155–3162 (Jun 10, 1996).

*Primary Examiner*—James Phan
(74) *Attorney, Agent, or Firm*—Hamilton, Brook, Smith & Reynolds, P.C.

(57) ABSTRACT

A light beam deflector comprising a modified asymmetric Fabry-Perot (Gires-Tournois) etalon having a back reflecting and electrically conducting mirror and a front partially transmitting mirror spaced apart by an electro-optic material, there also being a transparent sheet resistor between the electro-optic material and the front mirror. The invention further comprises a pair of electrodes contacting two generally parallel edges of the transparent sheet resistor so that if different voltages are applied between the electrodes with respect to the back conducting mirror, a front to back electric field which varies in a linear manner from one electrode to the other will be produced. By utilizing an electro-optic material with either a linear longitudinal electro-optic effect or one having a linearized quadratic electro-optic effect, a linear variation of refractive index in the material will be produced between the electrodes, further resulting in a linear phase shift across a light beam impinging on the front and undergoing multiple reflections inside the electro-optic material and still further resulting in an overall deflection of the reflected beam.

19 Claims, 4 Drawing Sheets

THIN FILM ELECTRO-OPTIC BEAM STEERING DEVICE

RELATED APPLICATIONS

This is a continuation of application Ser. No. 09/044,622, filed on Mar. 19, 1998, now abandoned, incorporated herein by reference, which is a continuation of application Ser. No. 08/795,281, filed on Feb. 4, 1997, now abandoned, which claims priority from a provisional application Ser. No. 60/011,186, filed on Feb. 5, 1996.

STATEMENT OF GOVERNMENTAL INTEREST

The U.S. Government has certain rights in this invention as provided for in Contract No. F08630-97-C-0022 awarded by the Department of the Air Force.

BACKGROUND OF THE INVENTION

1. Technical Field

The invention is in the field of electro-optic modulators of light wave direction.

2. Background

Laser beam steering or scanning technology is important for many optical systems including imaging laser radars, projection displays, optical interconnections, optical switches, and laser printers. Although several non-mechanical approaches to beam steering or scanning have been demonstrated, only a few have been adopted in practical systems. Beam scanning with rotating mirrors has been by far the most widely used technology, L. Bieser, et al, *Handbook of Optics,* M. Bass, ed., vol. 2, Ch. 19 (Optical Society of America, McGraw-Hill, New York, 1994). However, rotating mirror scanners are not suitable for compact optical systems. In addition, rotating mirror scanners may be vulnerable to vibrations and accelerations. Although significant advances have been made in the development of micro-mirror beam deflectors, currently available devices can only provide binary beam steering with moderate speed.

After mechanical mirrors, the next most widely used are acousto-optic deflectors, A. Korpel, *Applied Optics and Optical Engineering,* R. Kingslake, ed., vol. 6, (Academic Press, New York, 1980). These are bulk devices which are generally costly because of the high driving voltages required. Other devices include binary and ferroelectric liquid crystal beam deflectors, K. Hirabayashi et al, Applied Optics, vol.34, pp 2571 et seq (1995). At present, liquid crystal beam steering devices can provide reasonable performance for polarized light in temperature-controlled environments. However, their use in systems subject to large temperature fluctuations has been hindered because of the significant degradation of their electro-optical properties at very low or very high ambient temperatures and their response times are slow.

For some time, L. Bieser et al, SPIE Milestone Series, vol. 378 (1985), a large effort has been made to overcome the limitations of mechanical, acousto-optic and liquid crystal based beam deflectors using solid electro-optic crystals. These are characterized as having an index of refraction which changes in response to an electric field. The change with electric field can be linear (Pockels Effect) or quadratic (Kerr Effect). There are a number of different schemes which have been proposed. Many of these are based on the principle that, if a coherent light beam passes through a material and experiences a linear variation in index of refraction (equivalently, the velocity of light in the medium varies linearly) across the face of the beam, it will be bent in the direction of increasing index. U.S. Pat. No. 3,357,771 to Buhrer et al. discloses a beam deflector comprising an elongated bulk crystal of linear electro-optic effect potassium dihydrogen phosphate encased on two opposite elongated sides between hyperbolically shaped dielectric blocks which are in turn coated with conductors such that, when an AC voltage is applied to the conductors, a linear electric field variation occurs in the crystal causing the necessary linear variation in refractive index. A light beam propagating along the length of the crystal transverse to the electric field is deflected toward either of the non-encased elongated sides depending on instantaneous voltage polarity. U.S. Pat. No. 5,159,351 to Hotomi et al. using a lead lanthanum zirconate titanate (PLZT) bulk crystal relies on either a trapezoidal cross section coated on its even sides with a conductor or a rectangular cross section coated on one side with a resistive sheet electrode to achieve almost the same effect. Because the distance between electrodes is not small, it is not possible to create a perfectly linear variation. Also, in this bulk approach, the driving voltage is reasonably large (150 volts for a 2.34 degree deflection).

Another approach, U.S. Pat. No. 4,343.536 to Watanabe et al., uses a dual array of interdigitated stripe electrodes on one surface of an elongated crystal. When an AC voltage, especially in the MHz frequency range is applied, fringing fields extend into the interior and, even though not precisely linear, can cause a controllable deflection of a light beam. The patented device works with a large number of materials and is incorporated herein by reference for such teachings.

The aforementioned devices in which an electric field is applied transversely to the light propagation direction is advantageous in that the longer the device, the more the total deflection for a given driving voltage. The disadvantage is that microminiaturization is difficult and they are polarization sensitive.

For larger beam diameters, U.S. Pat. No. 3,787,111 to Giordmaine et al. discloses a device comprising a layer of strontium barium niobate (SBN) on a transparent substrate. A closely-spaced array of linear stripe electrodes is deposited on the SBN. Independent voltage means are used to change the index of refraction under each electrode creating, along a direction perpendicular to the stripes, an approximation to a linear variation in index of refraction. A light beam whose diameter is large compared to the electrode spacing traveling through the substrate and SBN will be deflected in a direction perpendicular to the stripes. In order to be most successful, this approach requires an electrode spacing which is small compared to the wavelength of the light. See U.S. Pat. No. 5,093,747 to Dorschner. If the electrode spacing is not small, diffraction effects occur creating side lobes off the main beam. This effect was utilized to advantage in U.S. Pat. No. 4,639,091 to Huignard et al.

In addition to light transmitted through a layered device, beam deflection of a reflected beam is desirable, especially for spatial light modulators (SLMs). U.S. Pat. No. 5,221,989 to Stappaerts et al. discloses a device utilizing a non-ferroelectric PLZT (obtained when the lanthanum concentration is in the range of 9% to 10%) ceramic plate coated on the light incident side (hereinafter "front") with a conducting semi-transparent electrode and on the back side with a rectangular array of reflecting electrode islands which may be further electrically isolated by placing grooves between them in the PLZT plate. For SLMs, the beam is not only deflected but intentionally distorted by producing desired phase shifts in each part of a light beam corresponding the to the size of the islands in the referenced patent. This device can utilize the linear Pockels effect, but utilizing the quadratic Kerr effect with a DC bias voltage requires less modulation voltage. For example, a bias of 550 volts allowed the use of a modulation voltage of 100 volts to produce a π/2 phase shift. By using a semi-transparent front electrode with a reflectance of 30%, the modulation voltage could be reduced by one third because of optical resonance between the front and back electrodes. However in this device, to minimize the side lobes due to diffraction effects, both the beam diameter and wavelength must be substantially larger than an individual pixel size, typically limited to no smaller than about one micron.

In summary, bulk crystal-based electro-optic deflectors, have not yet overcome the difficulties associated with their high driving voltages. Beam steering using multi-channel phased arrays has significant drawbacks because of the presence of higher-order deflections.

Recently, there has been great interest in developing organic electro-optic materials. Although they tend to be unstable with time and temperature, some show large electro-optic coefficients and they can be produced as thin films. See U.S. Pat. Nos. 4,773,743; 4,783,151; 4,807,968; 4,885,113; 4,887,889; 4,909,964; 4,962,979; 4,035,839; 5,053,168; 5,061,048; 5,112,532; 5,185,102; 5,194,548; 5,194,984; 5,200,541; 5,256,784; 5,323,482; 5,432,286; and 5,157,541 all of which are incorporated herein by reference. These patents indicate that many organic materials, if they have non-centrosymmetric crystalline structures, can produce a useful Pockels effect but these patents present only very basic devices.

Another application area of significant interest is optical interconnects in free-space routing. Current technologies, including multiple quantum well based electro-absorption modulators based on GaAs and related materials and surface emitting micro-lasers, have encountered substantial difficulties because of their material incompatibility with silicon-based microelectronic devices.

SUMMARY OF THE INVENTION

Accordingly, objects of the present invention are to overcome the limitations of the aforesaid devices and produce one which will not merely deflect but controllably steer a light beam and, in addition, be reliable, fast, compact, and have low energy consumption and cost. A further object of the invention is to allow its construction on silicon substrates if desired. All of these objectives are met by the invention described herein. This will have potential applications in a great variety of optical systems, including projection displays, imaging laser radars, optical fiber switches, laser printers, and free space interconnects.

As will be more fully described, although not limited to this choice, the invention makes use of complex-oxide materials which are inherently stable over a much wider temperature range than liquid-crystal-based deflectors. In addition, they are much faster. The electro-optic response time of a typical oxide electro-optic material is in the sub-nanosecond range, C. Bao, et al., CLEO '95, Baltimore, Md., May 21–26, 1995, compared to the millisecond range for liquid crystal materials. Because of the elimination of moving parts, the invention is expected to be rugged and insensitive to vibrations. As can be appreciated from the description, the invention produces no high order beams.

In one embodiment, the invention comprises a modified asymmetric Fabry-Perot (Gires-Tournois) etalon having a back reflecting and electrically conducting mirror and a front partially transmitting mirror spaced apart by an electro-optic material, there also being a transparent sheet resistor between the electro-optic material and the front mirror. The invention further comprises a pair of stripe electrodes contacting two parallel edges of the transparent sheet resistor so that if different voltages are applied between the electrodes and the back conducting mirror, a front to back electric field which varies in a linear manner from one electrode to the other will be produced. By utilizing an electro-optic material with a either a linear longitudinal electro-optic effect or a DC voltage bias on one having a quadratic electro-optic effect, a linear variation of refractive index in the material between the electrodes will be produced, further resulting in a linear phase shift across a light beam impinging on the front and undergoing multiple reflections inside the electro-optic material and still further resulting in an overall deflection of the reflected beam.

In another embodiment, the mirrors are made from stacks of dielectric material and an additional transparent conducting layer is used on the back mirror. In still another embodiment, two orthogonal pairs of stripe electrodes provide beam deflection in two dimensions.

When the invention is fabricated on silicon substrates, because of the capability of fast beam steering with low operating voltages, it may provide an opportunity for a breakthrough in silicon monolithic opto-electronic processors where arrays of the device can be used for programmable optical interconnects.

DETAILED DESCRIPTION OF THE INVENTION

Figure 1:
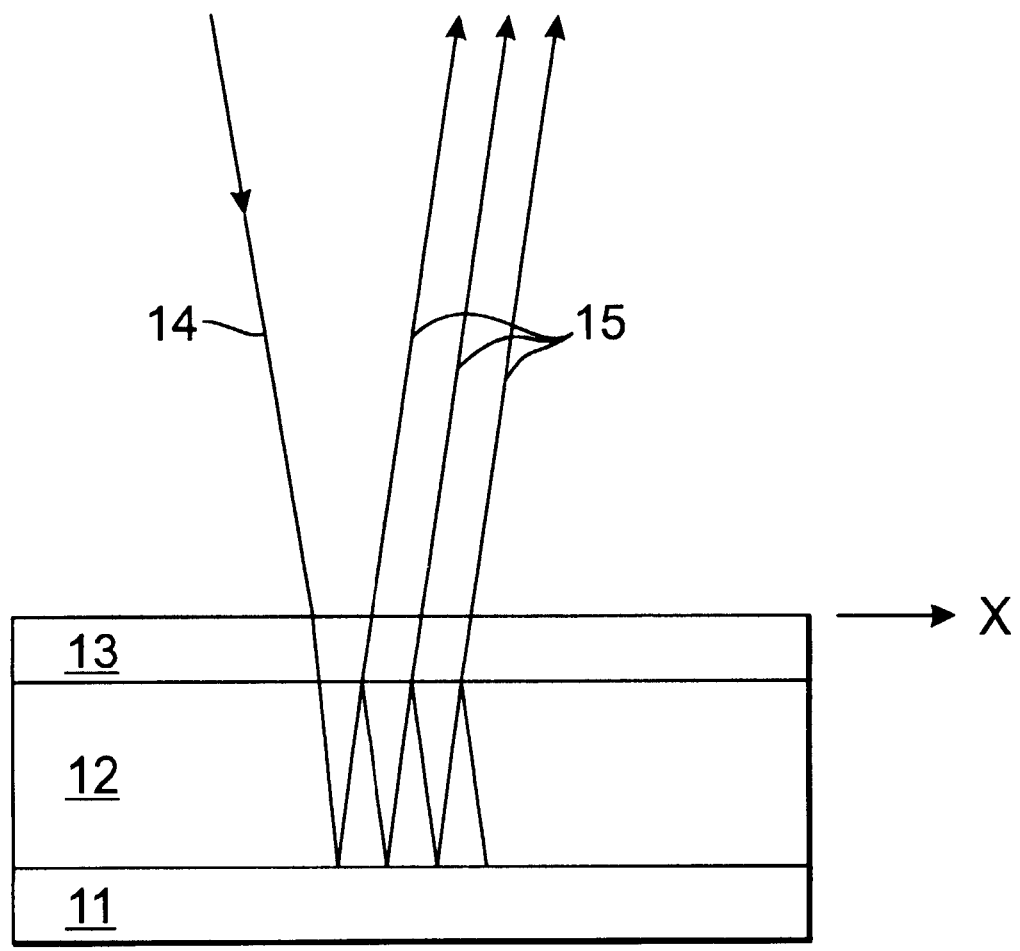
FIG. 1 shows the basic structure of the well known Gires-Tournois etalon.

The present invention can be better understood after considering the well known Gires-Tournois etalon structure, FIG. 1. The major use of this structure has been to modulate the optical phase of a reflected light beam which is typically normally incident. The structure consists of a back mirror 11 which is totally reflecting, an electro-optic material 12, and a front mirror 13 which is partially transmitting and partially reflecting. As shown in the figure, a single beam of light 14 is multiply reflected from the back and front mirrors. If the electro-optic material is optically uniform, these multiple reflections 15 are all at the same angle and of constant optical phase shift relative to the adjacent reflection. When the diameter of the incident light beam is sufficiently large or the incident angle is sufficiently small, the multiply reflected beams overlap in space and coherently interfere. The net overall optical phase shift of the overall reflected beam, composed of all the multiple reflections, would contain a contribution from each of the reflections.

This phase shift can be expressed by:

$$\Phi = -2\tan^{-1}\left(\frac{1+\sqrt{R}}{1-\sqrt{R}}\tan\phi\right) \quad (1)$$

where R is the reflectivity of the front mirror and $\phi = 2\pi nD/\lambda$ is the optical phase thickness of the electro-optic material where n is the index of refraction, D is the physical thickness of the material and λ is the wavelength of the light. It can be shown that if φ is in the vicinity of an integer multiple of π, a large change in Φ can be induced by a small deviation of φ from the integer multiple of π, namely Δφ. The large phase shift in the total reflected light beam is created by the multiplication of the small Δφ change due to the multiple reflections of the light in the etalon. Using a linear approximation (when Δφ is sufficiently close to an integer multiple of π, Equation 1 can be simplified to:

$$\Delta\Phi = -2\frac{1+\sqrt{R}}{1-\sqrt{R}}\Delta\phi \qquad (2)$$

The phase thickness variation, Δφ, therefore is multiplied by a factor of $2(1+\sqrt{R})/(1-\sqrt{R})$. For R=0.9, this factor is 38.

In order to reduce the required driving voltage, it is desirable to make R close to 1.0. However, this increases the number of reflections and, because of losses in the materials and back mirror, reduces the amplitude of the overall reflected beam. Formulas for calculating such losses in etalons are well know. Such calculations show that, for the special Gires-Tournois configuration, when the reflectivity of the front mirror is sufficiently small compared to the back mirror, the losses are very small. For a practical back mirror with a 99% reflectively, the front mirror can have a reflectivity of 90% without there being appreciable losses.

If a light beam covers an area within which there is a variation in the thickness or, more usefully, the refractive index of the electro-optic material, the phase shift will be different at different locations in the beam. In the particular case where the optical phase shift, ΔΦ, variation in the x-direction is linear, a beam is effectively tilted as shown in FIG. 2 which illustrates the basic invention.

Figure 2:
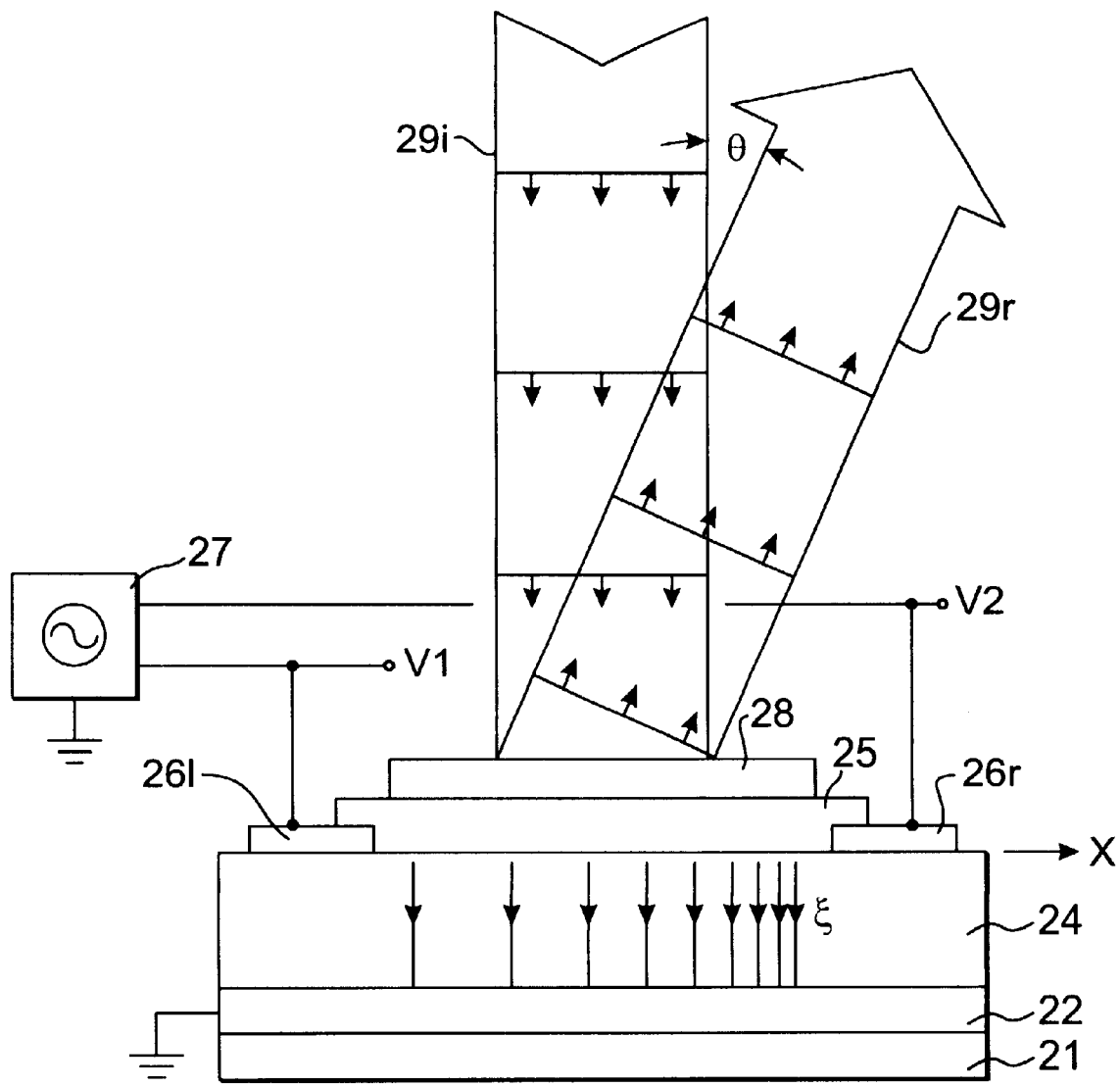
FIG. 2 shows the basic structure of the invention.

FIG. 2 shows a substrate used for support 21, a back mirror which is totally reflecting and electrically conductive 22, an electro-optic layer 24, a transparent sheet resistor 25 whose function will be explained below, electrical contacts 26 connected to a signal generator 27, and a front, partially reflecting and partially transmitting mirror 28. The perpendicular incident beam 29$i$ results in a phase-shifted reflected beam 29$r$ wherein the phase shift varies linearly as a function of position, as will be explained below. Such a phase shift, in effect, rotates the wave front of the reflected beam. Therefore, the propagation direction of the reflected beam is deflected from the direction it would ordinarily take. The magnitude of angle of this deflection depends on the change in optical phase shift from one side of the optical beam to the other and is given by the formula Θ=arctan (ΔΦ/(2 πw)) where w is the beam diameter expressed in terms of the number of wavelengths, λ. According to Equation 1, the continuous variation of ΔΦ can not be greater than 2 π and therefore, there is a tradeoff between the deflection angle and the beam diameter.

In order to obtain a linear variation in Φ, the phase thickness, Φ, of the electro-optic layer 24 must be made to vary linearly as a function of position in the axis of the deflection, according to Equation 2. The electro-optic material 24 is selected from those which can be made to have an index variation linearly dependent on the applied field in the longitudinal direction, i.e., the direction of light propagation. In general, material with a longitudinal electro-optic effect are those whose index of refraction, n, changes when an external electric field is applied in the direction of light propagation. The magnitude of the change in n is given by the formula, $\Delta n = -r\xi/(2n^3)$, where r is the longitudinal electro-optic coefficient and ξ is the electric field strength (volts/meter). This invention requires that r must be sensibly constant with voltage. Thus, if the material has only a quadratic longitudinal electro-optic effect, a constant bias voltage should be used to provide an approximately linear effect around the bias point. If so, and if the electric field varies linearly with position, so too will the phase shift, Φ.

Figure 4A:
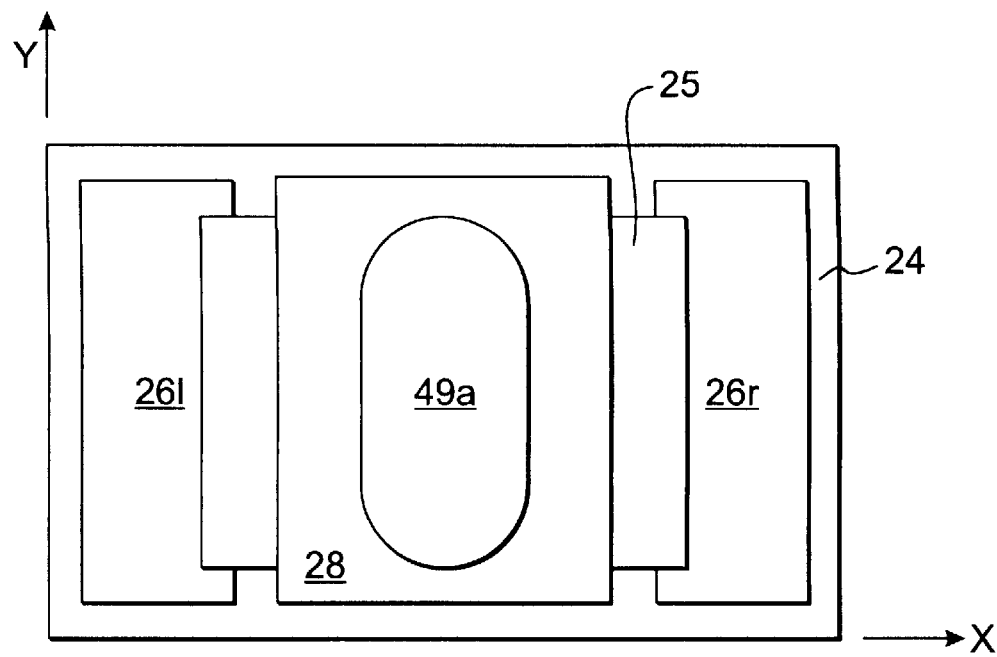
FIG. 4 shows two views of front sheet resistor electrode structures.

The linear variation of electric field is accomplished with a sheet resistor 25 of sensibly constant sheet resistance in rectangular form as seen looking from the front, FIG. 4a. In this case, if two different voltages with respect to the back, grounded mirror, V1 and V2, are applied across the sheet resistor 25, the voltage along the sheet resistor will vary linearly from V1 to V2. The electric field, ξ, applied to the electro-optic layer in the vertical direction, therefore, varies in magnitude along the x-direction from V1/D to V2/D, where D is the thickness of the electro-optic layer. Note that the deflection of the beam will depend only on the difference in voltages, V1–V2.

It can be seen from equation (1) that the continuous variation of ΔΦ is limited to between −π to π. It can be further seen that ΔΦ varies linearly with Δφ only when the later is sufficiently small, i.e., when Equation 2 applies. This property of the Gires-Tournois etalon implies that for beam deflection of large angles there might be significant wave front, or phase front distortion if Δφ varies linearly across the beam diameter. According to the inventor's modeling, beam deflection below ±10 decrees can be achieved with minimal phase front distortion, and the smaller the deflection angle is, the less the phase front distortion. In order to minimize the wave front distortion for greater deflection angles, one can compensate the distortion by creating a nonlinear variation of Δφ across the light beam. One of the possible schemes for such compensation is to use a sheet resistor with more than two electrodes, which will be further discussed below.

In summary, when an electro-optic layer 24 which possesses a linear longitudinal electro-optic effect or a linearized quadratic longitudinal electro-optic effect is utilized, a linear variation of φ along x can be created. When the electric-field-induced change, Δφ is sufficiently small, according to Equation 2, ΔΦ will vary linearly and the light beam will be deflected by Θ.

It should be further noted that the phase thickness change, Δφ, is proportional to Δn and D while the change in the index of refraction, Δn, is inversely proportional to D. Therefore, the phase thickness change and hence, beam deflection, are independent of thickness of the electro-optic material 25. However, if the electro-optic material 25 is too thin, it may be subject to dielectric breakdown. On the other hand, very thick materials may be difficult to fabricate. Those skilled in the art will appreciate that selection of a material and thickness must take into account these factors but the process of selection is well known.

Dielectric Mirror Embodiment

Figure 3:
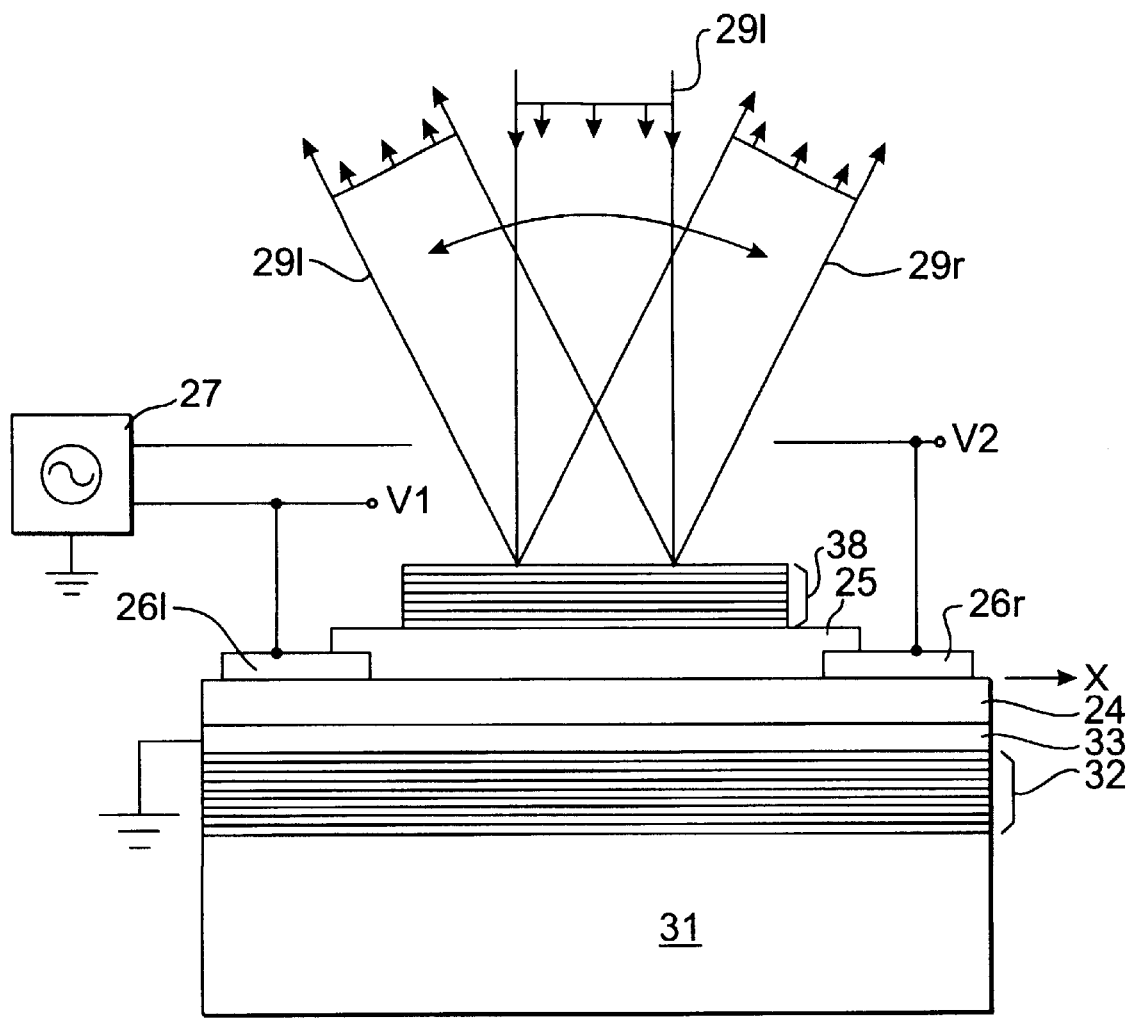
FIG. 3 shows a preferred embodiment of the invention.

Notwithstanding the large number of possible substrates, mirror and electro-optic materials which could be used to build the device shown in FIG. 2, dielectric mirrors can be superior to metal ones. An embodiment using these is illustrated in FIG. 3. In this device, the mirrors 32 and 38 are constructed from stacks of alternating layers of dielectric material to achieve very high reflectance and low absorption for the back mirror 32 and low absorption for the front mirror 38. Since the dielectric mirror 32 is non-conductive, a transparent conductive layer 33 must be added.

Although inorganic electro-optic materials and liquid crystals also were suggested herein as possible materials for the electro-optic layer 24, they lack stability when operated at high temperatures because of the degradation of their electro-optic properties. Of materials which will operate at high temperatures, PLZT is well studied and has relatively large electro-optic effects. Among other desirable physical properties possessed by PLZT materials are their good dielectric strength, fast electro-optic response speed and low optical absorption for a wide range of light wavelengths.

PLZT films are readily made by the Metalorganic Chemical Liquid Deposition (MOCLD) process, K. K. Li et al., "An Automatic Dip Coating Process for Dielectric Thin and Thick Films," Integrated Ferroelectrics. vol.3, pp. 81 et seq (1992), but the processing temperature requires a compatible substrate 31 and back dielectric mirror 32. Dielectric mirrors using different materials are commonly available from a number of commercial sources. The processing temperature requirement was met by using a single-crystal aluminum oxide ($Al_2O_3$, sapphire) as the substrate 31 coated with a thin amorphous layer of $Al_2O_3$ to enhance adhesion and using alternating dielectric layers of $SiO_2$ and $Ta_2O_5$ to make the back mirror 32 supplied by Quality Thin Films, Inc. of Oldsmar, Fla. A layer of transparent indium tin oxide applied with routine sputtering techniques served as the bottom electrode 33.

The MOCLD technique was used to deposit the electro-optic $(Pb_{1-x}La_x)(Zr_yTi_{1-y})O_3$ (PLZT) films, where the values of x and y were 0.09 and 0.65, respectively. Although routine in the art, the technique for depositing PLZT films will be described in more detail. It started with the preparation of a homogeneous chemical solution that consists of precursors for the four cations ($Pb^{++}$, $La^{+++}$, $Z^{++++}$, $Ti^{++++}$) in PLZT. These precursors are lead subacetate, hydrated lanthanum acetate, zirconium acetate aqueous solution, and titanium di-isopropoxy bis acetylacetonate. They were mixed in an alcoholic solvent, methyl alcohol, but ethyl alcohol or 2-methoxyethanol could have been used. The solution preparation sequence is described as follows: using the appropriate amounts of cations, hydrated lanthanum acetate was first dissolved into distilled water, and then mixed with zirconium acetate solution. Lead subacetate was then added and dissolved into this mixture of lanthanum and zirconium precursors. After the lead subacetate was completely dissolved, the alcoholic solvent and titanium di-isopropoxy his acetylacetonate were then added and mixed to form a homogeneous solution with a concentration of 8 grams of oxide (PLZT) in 100 grams of solution.

This solution was applied to the substrate by dip-coating at 25° C. with a substrate withdrawing speed of about 3 mm/sec. The resulting film thickness from one application varied from 20 to 70 nanometers. Alternately, spin-coating could be used with a typical spinning speed of 3000 rpm and a spinning time of 30 seconds.

The desired final total film thickness, D, is one that produces an optical thickness, nD of any integer multiple of half a wavelength. For 633 nanometer light, 1290 nanometers is a suitable thickness of PLZT. To achieve this total film thickness, more layers of the PLZT solution were deposited after firing the previously deposited layer. The heating temperature was about 700° C. for a duration of 2 minutes. The PLZT-coated substrate was heated to this temperature, and brought to a room temperature within 1 to 2 minutes. At the later stage of building up the film thickness, a more diluted chemical solution or a different set of processing conditions can be used to gradually approach the designated film thickness.

In this example of film fabrication, a conducting transparent gold film was used in place of resistive layer 25 in order to measure the overall PLZT properties. This partial structure made in the manner just describe produced a PLZT film showing good crystallinity and electro-optic properties. The X-ray diffraction showed sharp maximum at the expected angles and no spurious peaks. The polarization hysterisis curve showed that the PLZT film thus obtained was a slim looped ferroelectric, that is, there was no detectable coercive field nor any remnant polarization. (This is useful because were there hysteresis, there would also be in the beam deflection dependence on driving voltage.) Since such results are rather routinely produced, they are not illustrated.

To complete the structure, it would be necessary to form the front dielectric mirror 38. In this case, there is no need for further high temperature processing of the device and the choice of dielectric layer materials can much wider. The front transparent resistance layer 25 again can use sputtered indium tin oxide. However, desirable resistivity for the indium-tin oxide material can be obtained by adjusting the indium/tin ratio and the concentration of oxygen vacancies during the deposition. Contacts 26 must also be formed and connected to a signal generator 27. The signal generator need only be capable of two outputs of about ±20 volts at whatever frequency of beam deflection is desired.

Other Embodiments

The device is not restricted to deflection in one direction only. FIG. 4a shows the front electrode structure for a one dimensional embodiment. As in FIG. 2, on the electro-optic layer 24, is deposited the transparent sheet resistor 25 and thereon is deposited the electrical contacts 26l and 26r along with the partially transmitting and reflecting mirror 28 covering the area where the light beam impinges 49a. Deflection will be in the X-direction. In this embodiment, the light beam need not have a circular cross section and may be an elongated beam, as shown.

Figure 4B:
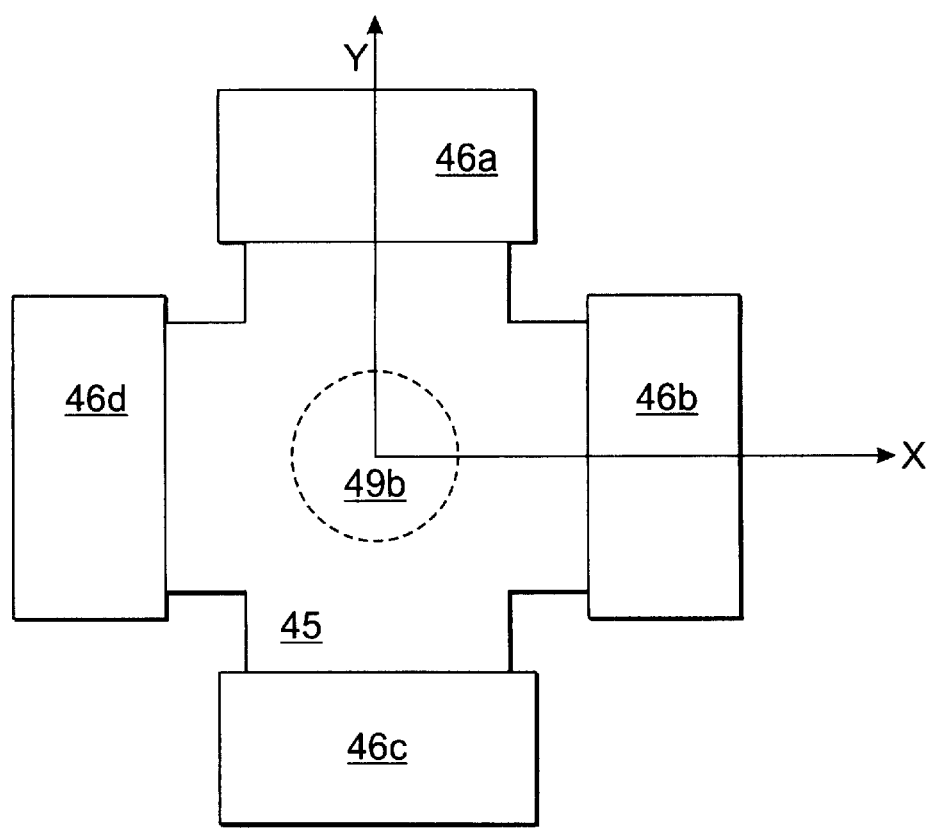

FIG. 4b illustrates an electrode structure for deflecting the beam in two directions. In this embodiment, four electrical contacts 46a, 46b. 46c, and 46d are arranged along orthogonal axes. The sheet resistor 45 is reconfigured from the one dimensional embodiment to have extensions to the contact area. Such extensions help to reduce fringing fields and produce a more linear voltage gradient in the beam impingement area 49b (shown as a circle but not by way of a limitation). Those skilled in the art will recognize that no extensions are necessary if the beam area is sufficiently small. The optimum sheet resistor shape can be readily determined by solving an ordinary two dimensional boundary value problem and using the teachings herein to determine the effect on wavefront deflection.

In particular, one solution of said two dimensional boundary value problem implies that a large enough plurality of electrical contacts spaced equally on the periphery of a circular sheet resistor whose voltages vary as the cosine of an angle with respect to any one direction will produce a linear voltage gradient along such direction. This solution requires a larger number of electrical contacts and independent signal generators than the embodiments illustrated herein, but although not necessary if the device is constructed on a silicon substrate, well known integrated circuits techniques could be used to conveniently provide the large plurality of signal generators.

Electro-optic Material Selection

As mentioned, a wide variety of electro-optic materials could be used for layer 24 and are selected based on the following criteria: 1) It must be transparent to the light to be steered, in other words, its absorption of the light should be minimal; 2) It must possess a sensible longitudinal electro-optic effect, i.e. its index of refraction exhibits a sensible change when an electric field at the desired beam deflection frequency is applied to the material along the direction of light propagation. A material that possesses either a linear or a quadratic longitudinal electro-optic effect may be used as 24. If a material possesses a linear longitudinal effect it may be directly used in the device. If a material possesses a quadratic longitudinal electro-optic effects. i.e. the change of its refractive index is proportional to the square of the applied field in the light propagation direction a DC bias field can be used to obtain a linear dependence of the index change on the electric field in a certain range; 3) It must also possess a high enough dielectric strength i.e. the material must not experience a dielectric breakdown under the applied electric field required to achieve the beam steering, and 4) There must be a method that allows one to produce a thin and uniform layer of such material on a highly reflective mirror. In the case that the mirror itself is not conductive, a conductive layer has to be added on the mirror and a method must exist for a thin and uniform layer of the material to be formed on such conductive layer.

All materials possess, to a greater or lesser degree, a quadratic electro-optic effect. It is known that only certain crystal classes produce a linear electro-optic effect, those which are non-centrosymmetric. Among these, it is also known that only a subset which lack further specific symmetries, could have a linear longitudinal electro-optic effect, A. Yariv et al., *Optical Waves in Crytals,* John Wiley & Sons (1984). However, even though there are a large number of inorganic bulk crystals in the longitudinal subset, the effect is rather uncommon in inorganic thin films. Therefore, the selection of inorganic materials is concentrated on those which, in thin film form, have a useful quadratic electro-optic effect. Among these are $BaTiO_3$, $KH_2PO_4$, $KNbO_3$, $LiNbO_3$, $LiTaO_3$, $(Pb,La)(Zr,Ti))O_3$, $Pb(Mg,Nb)O_3$, a solid solution of $Pb(Mg,Nb)O_3$ and $PbTaO_3$, and $(Sr,Ba)Nb_2O_6$. This list is not meant to be exhaustive, since others may exist or be found in the future.

Liquid crystal or organic materials to be used for the electro-optic material 24 should be selected from among those which exhibit a continuous change in refractive index when subjected to an external electric field in a longitudinal direction.

Prophetic Material Example

As an example, the MOCLD-derived PLZT layer on an ITO-coated dielectric mirror can be used as 24. Typically, these PLZT films possess a longitudinal quadratic electro-optic coefficient of $0.6 \times 10^{-4}$ (micron/volt)$^2$. If one uses a bias field of 7.5 volt/micron on a PLZT film of 886 nm thickness, an equivalent linear longitudinal electro-optic coefficient of $9 \times 10^{-4}$ is created. Using this material in the invented device with R=0.8 for the front mirror, a voltage differential of (V1–V2)=±10 volts across a sheet resistor ten wavelengths in width will deflect a laser beam by ±7 degrees. This steering field superimposed on the bias field is still well below the breakdown field strength for the PLZT films.

Substrate Selection

In most cases, the substrate is essentially a support and is selected to be compatible with processes necessary to create the rest of the device. When, for instance, liquid crystals or organic electro-optic films are used, there is usually no need for high temperatures. With electro-optic metal-oxides, the substrate should be selected from materials that satisfy the following criteria: 1) it should be stable at the temperature required for the deposition of the electro-optic layer and no adverse chemical reactions with the precursors should occur, 2) at least one surface of the material must be polished to a satisfactory optical flatness; and 3) it should promote the binding between itself and the layered structure built upon it, which requires the balance of stress inside the layered structure through matching the thermal expansion coefficients. Sapphire is one example, but silicon is another.

While only one preferred embodiment has been described in detail, it should be understood this is not intended to limit the invention to this particular one. Those skilled in these arts will readily understand from the description that the electro-optic material structure is generally limited to planar thin films having a thickness on the order of the wavelength of the light to be deflected; but, within such limitation, the invention covers a multitude of alternatives, modifications or equivalents which are within the scope of the invention as expressed in the appended claims.

What is claimed is:

1. A generally planar thin-film electro-optic beam steering device for controllably deflecting a reflected light beam, the light beam having an angle of incidence and an angle of reflectance, the device comprising:

a substrate for providing a support;

a first reflective layer disposed on said substrate and having a first reflectance;

a first transparent electrically conducting layer disposed on said first reflective layer and having at least a first electrical contact;

a light transmissive thin-film electro-optic material layer disposed on said first reflective layer;

a second transparent electrically conducting layer disposed on said electro-optic material layer and having at least second and third electrical contacts disposed on opposite sides of said second transparent electrically conducting layer; and a second light reflecting layer disposed on said second transparent electrically conducting layer and having a second reflectance that is less than the reflectance of said first reflective layer such that a first voltage applied between said first and second contacts and a second voltage having a different value than said first voltage that is applied between said first and third contacts generates an electric field in said electro-optic material layer that varies approximately linearly along a line between said second contact and said third contact, the angle of reflectance of the incident light beam being different from the angle of incidence.

2. The device of claim 1 wherein said electro-optic material layer has an optical thickness that is an odd-integer multiple of half the wavelength of an incident light beam.

3. The device of claim 1 wherein said electro-optic material layer is comprised of a ferroelectric material.

4. The device of claim 3 wherein said ferroelectric material is comprised of PLZT.

5. The device of claim 3 wherein said ferroelectric material is comprised of a liquid crystal.

6. The device of claim 1 wherein said electro-optic material layer is comprised of a ferroelectric material having an optical thickness that is an odd-integer multiple of half the wavelength of an incident light beam.

7. The device of claim 1 wherein said second and third contacts are disposed on opposing sides of said first transparent electrically conductive layer, and not on said second layer, and said first contact is disposed on said second transparent electrically conducting layer, and not on said first layer.

8. The device of claim 1 wherein said first and second light reflective layers are comprised of dielectric stacks.

9. The device of claim 8 wherein said electro-optical material layer has an optical thickness that is an odd-integer multiple of half a wavelength of an incident light beam.

10. The device of claim 8 wherein said electro-optic material layer comprises a ferroelectric material.

11. The device of claim 8 wherein said electro-optic material layer comprises lead lanthanum zirconate titanate (PLZT).

12. The device of claim 10 wherein said ferroelectric material is comprised of a liquid crystal.

13. The device claim 8 wherein said electro-optic material layer is comprised of a ferroelectric material having an optical thickness that is an odd-integer multiple of half the wavelength of an incident light beam.

14. A generally planar thin-film electro-optic beam steering device for controllably deflecting a reflected light beam in two directions, the light beam having an angle of incidence and an angle of reflectance, the device comprising:

a substrate for providing a support;

a first reflective layer disposed on said substrate and having a first reflectance;

a first transparent electrically conducting layer disposed on said first highly reflective layer and having at least a first electrical contact;

a substantially transparent thin-film electro-optic material layer disposed on said first conducting layer;

a second transparent electrically conducting layer disposed on said electro-optic material layer and having extensions from an area in a first direction and a second direction, said first direction extension having second and third electrical contacts and said second direction extension having fourth and fifth electrical contacts; and a second light reflecting layer disposed on said second transparent electrically conducting layer and having a second reflectance less than the first reflectance of said first reflective layer, such that applied voltages between said first and said second, third, fourth, and fifth contacts deflects an incident light beam, the angle of reflection being different from the angle incidence in both of said first and second directions.

15. The device of claim 14 wherein said electro-optic material layer has an optical thickness that is an odd-integer multiple of half the wavelength of an incident light beam.

16. The device of claim 14 wherein said electro-optic material layer comprises a ferroelectric material.

17. The device of claim 14 wherein said electro-optic material layer comprises lead lanthanum zirconate titanate (PLZT).

18. The device of claim 16 wherein said ferroelectric material is comprised of a liquid crystal.

19. The device of claim 14 wherein said electro-optic material layer comprises a ferroelectric material having an optical thickness that is an odd-integer multiple of half the wavelength of an incident light beam.

* * * * *